United States Patent
Appeltauer et al.

(10) Patent No.: US 9,322,439 B2
(45) Date of Patent: Apr. 26, 2016

(54) FORM-FIT COUPLING ACTUATING DEVICE OF A MOTOR VEHICLE TRANSMISSION

(75) Inventors: Peter Appeltauer, Fellbach (DE); Gerhard Spengler, Jettingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/131,961

(22) PCT Filed: Jul. 13, 2012

(86) PCT No.: PCT/EP2012/002961
§ 371 (c)(1),
(2), (4) Date: Jan. 10, 2014

(87) PCT Pub. No.: WO2013/007392
PCT Pub. Date: Jan. 17, 2013

(65) Prior Publication Data
US 2014/0151178 A1  Jun. 5, 2014

(30) Foreign Application Priority Data

Jul. 13, 2011  (DE) .......................... 10 2011 107 245

(51) Int. Cl.
| F16D 47/02 | (2006.01) |
| F16D 21/00 | (2006.01) |
| F16D 21/08 | (2006.01) |
| F16D 23/04 | (2006.01) |
| F16D 23/12 | (2006.01) |
| F16D 28/00 | (2006.01) |

(52) U.S. Cl.
CPC ................ *F16D 21/00* (2013.01); *F16D 21/08* (2013.01); *F16D 23/04* (2013.01); *F16D 23/12* (2013.01); *F16D 28/00* (2013.01); *F16D 47/02* (2013.01); *F16D 2023/123* (2013.01)

(58) Field of Classification Search
CPC ......... F16D 21/00; F16D 23/12; F16D 47/02; F16D 28/00; F16D 23/04; F16D 21/08; F16D 2023/123
USPC ............. 192/48.5, 53.31, 53.32, 87.17, 89 B; 74/330; 475/303
See application file for complete search history.

(56) References Cited

U.S. PATENT DOCUMENTS

| 3,324,981 A | 6/1967 | Aschauer | |
| 3,881,584 A * | 5/1975 | Marsch | 192/85.39 |
| 4,131,185 A * | 12/1978 | Schall | 192/53.5 |

(Continued)

FOREIGN PATENT DOCUMENTS

| DE | 1 600 124 | 6/1966 |
| DE | 10 2007 036 100 A1 | 2/2009 |
| EP | 1 527 937 A2 | 5/2005 |
| JP | 2009-510353 A | 3/2009 |

OTHER PUBLICATIONS

International Search Report (PCT/ISA/210) with English translation dated Oct. 15, 2012 (Six (6) pages).

(Continued)

*Primary Examiner* — David J Hlavka
(74) *Attorney, Agent, or Firm* — Crowell & Moring LLP

(57) ABSTRACT

A positive clutch actuating device of a motor vehicle transmission for shifting a positive clutch that is situated in series with a friction clutch includes at least one actuating unit having at least one gate track, which is provided for mechanically converting a rotary movement into a linear movement in order to actuate the positive clutch.

12 Claims, 1 Drawing Sheet

(56) References Cited

U.S. PATENT DOCUMENTS

| | | |
|---|---|---|
| 6,786,317 B2 * | 9/2004 | Matsufuji et al. ........ 192/48.611 |
| 7,198,143 B2 * | 4/2007 | Legner ....................... 192/53.34 |
| 7,384,366 B2 * | 6/2008 | Kelley, Jr. ..................... 475/296 |
| 8,584,823 B2 * | 11/2013 | Phillips et al. ............... 192/48.5 |
| 2004/0198548 A1 * | 10/2004 | Showalter et al. ............ 475/303 |
| 2007/0180940 A1 | 8/2007 | Mizon et al. |
| 2010/0219034 A1 | 9/2010 | Wheals et al. |

OTHER PUBLICATIONS

German language Written Opinion (PCT/ISA/237) dated Oct. 15, 2012 (Six (6) pages).

Japanese Office Action dated Jan. 20, 2015 (Two (2) pages).

* cited by examiner

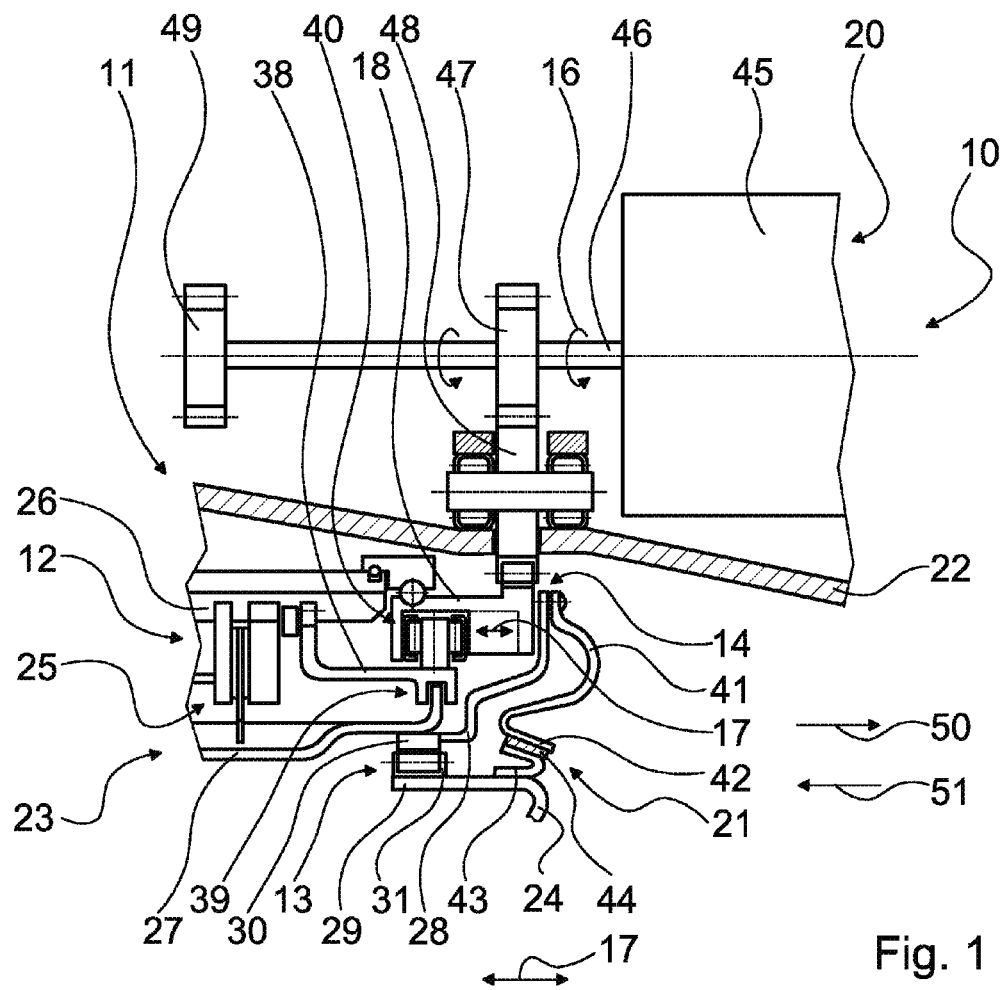
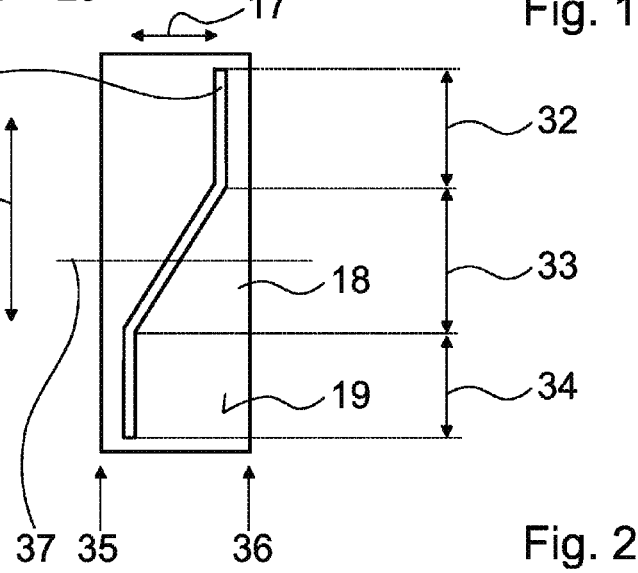
Fig. 1
Fig. 2

FORM-FIT COUPLING ACTUATING DEVICE OF A MOTOR VEHICLE TRANSMISSION

BACKGROUND AND SUMMARY OF THE INVENTION

Exemplary embodiments of the present invention relates to a positive clutch actuating device of a motor vehicle transmission.

German patent document DE 10 2007 036 100 A1 discloses a positive clutch actuating device of a motor vehicle transmission for shifting a positive clutch, having an actuating unit.

Exemplary embodiments of the present invention are directed to providing a space-saving actuation of the positive clutch, by means of which drag losses may be reduced.

According to the invention, a positive clutch actuating device of a motor vehicle transmission for shifting a positive clutch that is situated in series with a friction clutch is provided. The device has at least one actuating unit that has at least one gate track provided for mechanically converting a rotary movement into a linear movement in order to actuate the positive clutch. The positive clutch may thus be engaged and disengaged in a particularly space-saving manner, so that the friction clutch may be at least partially decoupled from a force flow. Particularly advantageous coupling and decoupling of the friction clutch may be achieved, by means of which drag losses of a disengaged friction clutch, and thus of the motor vehicle transmission, may be reduced. Shifting travel distances may thus be shortened, so that the installation space required for the actuating unit of the positive clutch actuating device in the motor vehicle transmission may be reduced. Space-saving actuation of the positive clutch may be provided, by means of which drag losses of the motor vehicle transmission may be reduced.

The term "positive clutch situated in series with a friction clutch" should be understood as a positive clutch situated in a force flow upstream from the friction clutch and/or which is provided for decoupling at least a portion of the friction clutch from the force flow. The positive clutch situated in series with the friction clutch is preferably provided to prevent the force flow at least through a portion of the friction clutch. The term "force flow" should be understood as a drive force flow resulting from and/or which is provided by a drive machine of a motor vehicle having the positive clutch actuating device. The force flow is preferably provided for driving drive wheels of the motor vehicle. The force flow advantageously differs from an actuating force flow which is provided by the actuating unit.

A "gate track" should be understood as a track for forced guidance of a shifting element on at least one side, preferably on both sides. The gate track is preferably designed in the form of a web, a slot, a groove, and/or a screw thread. The shifting element is preferably designed in the form of a shifting shoe surrounding the web, in the form of a pin that engages in the slot, in the form of a pin which is guided in the groove, and/or in the form of a pin that is guided by the screw thread. The gate track advantageously converts a rotary movement into an axial adjusting force that is provided for shifting, i.e., for disengaging and engaging, the positive clutch. The term "provided" should be understood as specially designed, equipped, and/or situated.

In accordance with exemplary embodiments of the present invention the actuating unit has an internal gear that at least partially encloses the gate track, which achieves a particularly advantageous actuation of the positive clutch. In the present context, the term "enclose" should be understood as the internal gear forms the gate track, and/or that the gate track is introduced into the internal gear.

In one advantageous embodiment, the gate track is situated on an inner periphery of the internal gear, which further reduces the required installation space of the actuating unit. In the present context, the term "situated" should be understood as the inner side of the internal gear forms the gate track, and/or that the gate track is introduced on the inner side of the internal gear.

Furthermore, the positive clutch actuating device has a synchronizing unit which is provided for synchronizing the positive clutch, as the result of which comfort may be enhanced.

Additionally, the positive clutch actuating device has an actuator unit provided for acting with the rotary movement on the internal gear in order to actuate the positive clutch. The internal gear may thus be driven in a particularly advantageous manner, as the result of which the positive clutch may be actuated, and therefore the friction clutch may be decoupled and coupled, in a particularly advantageous manner. The actuator unit is preferably designed as an external actuator unit. The actuator unit is preferably situated at least partially outside the motor vehicle transmission and/or designed independently from actuation of the friction clutch. In the present context, the term "at least partially" should be understood as at least one drive of the actuator unit is situated outside the motor vehicle transmission. The term "outside the motor vehicle transmission" should be understood as outside an area of a transmission housing of the motor vehicle transmission in which the torque- and rotational speed-conducting parts are present. The actuator unit is preferably situated in an area of the transmission housing in which a hydraulic control unit is accommodated, and which is closed off by an oil pan. The actuator unit may also be sealed off by an oil pan or a cover which is separately mounted on the transmission housing. In the present context, the term "independently" should be understood as the positive clutch and the friction clutch may be actuated and/or controlled independently of one another. The actuation of the positive clutch and the actuation of the friction clutch are preferably separate from one another.

In particular, it is advantageous for the actuator unit to be in drive connection with the actuating unit, and at the same time to be in drive connection with a further actuating unit that is provided for actuating a further positive clutch. In this way, two positive clutches of the motor vehicle transmission may be actuated at the same time, so that further cost savings may be realized. The term "in drive connection" should be understood as the internal gear of the actuating unit and an internal gear of the further actuating unit are simultaneously in operative connection with the actuator unit. The internal gear of the actuating unit and the internal gear of the further actuating unit are preferably jointly acted on by the rotary movement, and thus driven, by means of the actuator unit.

In addition, it is advantageous for the positive clutch to be designed as a dog clutch, which provides a particularly advantageous positive clutch.

Furthermore, the present invention is directed to a method for shifting a positive clutch that is situated in series with a friction clutch by means of a positive clutch actuating device, in particular by means of a positive clutch actuating device according to the invention, wherein a rotary movement is mechanically converted into a linear movement order to actuate the positive clutch, as the result of which the positive clutch may be actuated in a particularly space-saving manner and the friction clutch may be decoupled.

Further advantages result from the following description of the drawings. One exemplary embodiment of the invention is illustrated in the drawings. The drawings, the description, and the claims contain numerous features in combination. Those skilled in the art will also advantageously consider the features individually and combine them into further meaningful combinations.

BRIEF DESCRIPTION OF THE DRAWING FIGURES

The figures show the following:

FIG. 1 shows part of a motor vehicle transmission having a positive clutch actuating device, in a partially schematic illustration; and FIG. 2 shows the interior of an internal gear of the positive clutch actuating device together with a gate track, in a partially schematic illustration.

DETAILED DESCRIPTION

FIG. 1 shows part of a motor vehicle transmission 11 for shifting multiple transmission gears. The motor vehicle transmission 11 is designed as an automatic transmission. For adjusting the transmission gears, the motor vehicle transmission 11 has a set of transmission gears with a planetary design, not illustrated in greater detail. The motor vehicle transmission 11 has four planetary gears situated in succession. All planetary gears have a single planetary gear set. The motor vehicle transmission 11 also has a stationary mounted transmission housing 22. The motor vehicle transmission 11 includes multiple coupling units for shifting the transmission gears, and thus the planetary gears, only one coupling unit 23 being illustrated. The coupling unit 23 is designed as a braking unit that is provided for selectively connecting or disconnecting a rotatable coupling element to/from the transmission housing 22. In this exemplary embodiment, the rotatable coupling element is designed as an internal gear of one of the four planetary gears. For connecting to the rotatable coupling element, the motor vehicle transmission 11 has a connecting element 24 fixedly connected to the rotatable coupling element. Of course, the rotatable coupling element may also be designed as a sun wheel and/or as a planetary gear support of one of the four planetary gears. In principle, the coupling unit 23 may also be designed as a clutch unit that is provided for selectively connecting or disconnecting two rotatably mounted coupling elements. In addition, it is conceivable in principle for the motor vehicle transmission 11 to be designed as a semi-automatic transmission.

The coupling unit 23 has a power-shiftable design. The coupling unit 23 has a friction clutch 12 and a positive clutch 13 situated in series with the friction clutch 12. The positive clutch 13 is situated upstream from the friction clutch 12 with respect to a force flow. When the positive clutch 13 is engaged and the friction clutch 12 is engaged, the force flow is conducted from the rotatable coupling element via the connecting element 24 to the positive clutch 13, and then from the positive clutch 13 to the friction clutch 12, and thus to the transmission housing 22. The positive clutch 13 is provided for disconnecting the friction clutch 12 from the force flow.

The friction clutch 12 has multiple plates 25, an outer plate carrier 26, and an inner plate carrier 27. The outer plate carrier 26 is fixedly connected to the transmission housing 22. The inner plate carrier 27 is decoupleable, and is decoupleable from the connecting element 24, and thus from the force flow. The inner plate carrier 27 is axially displaceable, and is axially displaceable with respect to the outer plate carrier 26. The plates 25, which are accommodated by the outer plate carrier 26, are situated on the outer plate carrier 26 in an axially displaceable and rotationally fixed manner. The plates 25, which are accommodated by the inner plate carrier 27, are situated on the inner plate carrier 27 in an axially displaceable and rotationally fixed manner. For actuating the friction clutch 12, the motor vehicle transmission 11 includes a friction clutch actuating device, not illustrated in greater detail, which has a hydraulic actuator unit which is provided for actuating the friction clutch 12. The hydraulic actuator unit is provided for supplying a hydraulic actuating force that presses the plates 25 together and thus connects the outer plate carrier 26 and the inner plate carrier 27 to one another by friction. The friction clutch actuating device, and thus the hydraulic actuator unit, is situated within the motor vehicle transmission 11. The friction clutch actuating device is situated within the transmission housing 22. The hydraulic actuator unit has a hydraulically actuatable piston. The friction clutch 12 is designed as a multiple disc brake.

The positive clutch 13 has a first positive-fit element 28 and a second positive-fit element 29. The first positive-fit element 28 has a positive-fit contour 30, and the second positive-fit element 29 has a positive-fit contour 31, which have a mutually corresponding design. The first positive-fit element 28 is connected to the decoupleable inner plate carrier 27 in a rotationally and displaceably fixed manner. The first positive-fit element 28 is situated so as to be axially displaceable with respect to the second positive-fit element 29. The second positive-fit element 29 is formed as one piece with the connecting element 24. The connecting element 24 has the positive-fit contour 31. When the positive clutch 13 is engaged, the positive-fit contours 30, 31 interlock with one another, as the result of which the first positive-fit element 28 and the second positive-fit element 29, and thus the inner plate carrier 27 and the connecting element 24, are connected to one another in a positive-fit manner. When the positive clutch 13 is engaged, the friction clutch 12 is coupled to the connecting element 24, and thus to the rotatable coupling element. The inner plate carrier 27 is connected to the connecting element 24 when the positive clutch 13 is engaged. When the positive clutch 13 is engaged, the coupling unit 23 may be engaged by means of the friction clutch 12. The positive-fit contours 30, 31 are each designed as claw toothing. The positive clutch 13 is designed as a dog clutch.

In accordance with the invention, the motor vehicle transmission 11 has a positive clutch actuating device 10 for coupling and decoupling the friction clutch 12. The positive clutch actuating device 10 is provided for selectively disconnecting the friction clutch 12 from, or connecting the friction clutch 12 to, the connecting element 24 by means of the positive clutch 13. The positive clutch actuating device is provided for selectively decoupling the friction clutch 12 from, or coupling the friction clutch 12 to, the connecting element 24 by means of the positive clutch 13. The positive clutch actuating device 10 shifts the positive clutch 13, which is situated in series with the friction clutch 12.

The positive clutch actuating device 10 has an actuating unit 14 for shifting the positive clutch 13. The actuating unit 14 is situated within the motor vehicle transmission 11, and is situated inside the transmission housing 22. The actuating unit 14 includes a gate track 15 for actuating the positive clutch 13, the gate track mechanically converting a rotary movement 16 into a linear movement 17. The gate track 15 converts a rotary movement 16 into an axial actuating force of the positive clutch 13, thus disengaging or engaging the positive clutch 13. The gate track 15 is designed as a groove. In principle, the gate track 15 may also be designed as a screw thread.

The actuating unit 14 also has an internal gear 18 surrounding the gate track 15. The internal gear 18 forms the gate track 15. The gate track 15 is situated on an inner periphery 19 of the internal gear 18, and extends on an inner side of the internal gear 18. The internal gear 18 has the gate track 15 on its inner side. The gate track 15 is designed as a groove in the internal gear 18. The gate track 15 has three areas 32, 33, 34. The areas 32, 33, 34 each have a linear progression. Area 32 and area 34 are offset relative to one another in parallel. Area 34 extends at an axial end 35 of the internal gear 18, and area 32 extends at the opposite axial end 36 of the internal gear 18. Area 33 connects the two areas 32, 34 to one another. Area 33 extends obliquely from end 35 to end 36. Areas 32, 34 have a perpendicular progression, and area 33 has an oblique progression, with respect to an axis of rotation 37 of the internal gear 18 (see FIG. 2). The obliquely extending area 33 of the gate track 15 converts the rotary movement 16 into the linear movement 17.

The actuating unit 14 has a shifting element 38 for displacing the first positive-fit element 28, and thus the inner plate carrier 27. The shifting element 38 is connected to the outer plate carrier 26 in an axially displaceable and rotationally fixed manner. The shifting element 38 is connected to the inner plate carrier 27 in an axially displaceable and rotationally fixed manner. The shifting element is axially movable with respect to the outer plate carrier 26, and is axially fixed with respect to the inner plate carrier 27. The shifting element 38 is connected in a positive-fit manner to the inner plate carrier 27 in an axial direction. The inner plate carrier 27 engages with the shifting element 38. The shifting element 38 has a shoe-shaped area 39 which surrounds an axial end of the inner plate carrier 27. The shoe-shaped area 39 of the shifting element 38 is connected in a positive-fit manner to the inner plate carrier 27 in the axial direction. The shifting element 38 that engages with the gate track 15 is linearly displaced in the area 33 by means of a guide.

The shifting element 38 partially engages with the internal gear 18, and engages with the gate track 15. The shifting element 38 has a pin-shaped area 40 via which it engages with the gate track 15. The shifting element 38 has a pin in the pin-shaped area 40 that engages with the gate track 15. The internal gear 18 guides the shifting element 38 along the gate track 15. The gate track 15 converts the rotary movement 16 of the internal gear 18 into the linear movement 17 of the engaging shifting element 38. The shifting element 38 is forcibly guided by the gate track 15. In principle, the internal gear 18 may also have the pin-shaped area 40, and the shifting element 38 may also have the gate track 15 with which the pin-shaped area 40 of the internal gear 18 engages.

The positive clutch actuating device 10 has a synchronizing unit 21 for synchronizing the positive clutch 13. The synchronizing unit 21 has a spring element 41, a first synchronization element 42, a second synchronization element 43, and a friction lining 44. The synchronization elements 42, 43 in each case form inclined surfaces that lie one on top of the other for the synchronization, a rotational speed adjustment between the synchronization elements 42, 43 taking place due to friction. For improving the synchronization, the friction lining 44 is situated between the two synchronization elements 42, 43, and is situated between the inclined surfaces. The friction lining 44 is fixedly connected to the second synchronization element 43. The spring element 41 and the first synchronization element 42 are formed as one piece. The spring element 41 has the inclined surface, which is provided for flatly contacting the inclined surface of the second synchronization element 43 in order to synchronize the positive clutch 13. The spring element 41 is connected to the first positive-fit element 28 in a rotationally and displaceably fixed manner, and is connected to the first positive-fit element 28 in a positive-fit manner. The spring element 41, the first positive-fit element 28, and the inner plate carrier 27 are fixedly connected to one another. The second synchronization element 43 is connected to the connecting element 24 in a rotationally and displaceably fixed manner.

The positive clutch actuating device 10 has an actuator unit 20 for the action of the rotary movement 16 on the internal gear 18. The actuator unit 20 is provided for acting with the rotary movement 16 on the internal gear 18 in order to actuate the positive clutch 13. The actuator unit 20 is provided for driving the internal gear 18 in order to shift the positive clutch 13.

The actuator unit 20 has a drive 45, a drive shaft 46, a drive wheel 47, and an intermediate gear 48. The drive 45 drives the drive wheel 47 by means of the drive shaft 46, and acts with the rotary movement 16 on the drive wheel 47. The drive shaft 46 is fixedly connected to the drive wheel 47. The drive wheel 47, the intermediate gear 48, and the internal gear 18 are in operative connection with one another, and are intermeshed. The internal gear 18 is in operative connection with the drive wheel 47 via the intermediate gear 48. The drive 45 thus drives the internal gear 18 and thus actuates the positive clutch 13. The drive wheel 47, the intermediate gear 48, and the internal gear 18 are each formed as gearwheels, and in each case have external toothing. The internal gear 18 meshes with the intermediate gear 48 and the intermediate gear 48 meshes with the drive wheel 47. The drive 45 is designed as an electric motor.

The actuator unit 20 is in drive connection with the actuating unit 14, and at the same time is in drive connection with a further actuating unit that is provided for actuating a further positive clutch. The further actuating unit is not illustrated for the sake of clarity. The further actuating unit has a design analogous to that of the actuating unit 14, the further actuating unit being associated with another coupling unit. The other coupling unit has a design analogous to that of the coupling unit 23. The other coupling unit is likewise designed as a braking unit that is provided for selectively connecting or disconnecting a rotatable coupling element to/from the transmission housing 22 in a rotationally fixed manner, in the present exemplary embodiment this rotatable coupling element being designed as a sun wheel.

For the simultaneous drive connection, the actuator unit 20 has a second drive wheel 49 that is fixedly connected to the drive shaft 46. The drive shaft 46 is fixedly connected to both drive wheels 47, 49. The drive 45 drives the drive wheel 47 by means of the drive shaft 46, and at the same time drives the drive wheel 49. The actuator unit 20 also has a second intermediate gear, not illustrated in greater detail, which meshes with the second drive wheel 49 and an internal gear of the further actuating unit. A gate track of the further actuating unit differs from the gate track 15. The two gate tracks are coordinated with one another, depending on the transmission design. The coupling unit 23 and the other coupling unit thus have a shared actuator unit 20, and thus a shared drive 45. The drive 45 simultaneously drives two internal gears 18 by means of different actuating units 14. The drive thus actuates two positive clutches 13 in parallel. In principle, a shared or simultaneous drive connection may be dispensed with, so that the actuator unit 20 is in drive connection only with the actuating unit 14.

The positive clutch actuating device 10 and the friction clutch actuating device are separate from one another. The actuator unit 20 is separate from the hydraulic actuator unit. The actuator unit 20 and the hydraulic actuator unit are independently controllable. The actuator unit 20 is independent from the hydraulic actuator unit that is provided for actuating the friction clutch 12. An actuation of the positive clutch 13 is decoupled from an actuation of the friction clutch 12 by movement and/or by mechanical means. The actuator unit 20 is independent, in terms of movement and/or mechanically, from the hydraulic actuator unit. In principle, the motor vehicle transmission 11 may have at least one further positive clutch actuating device according to the invention, a drive of the further positive clutch actuating device being provided for actuating a positive clutch or for actuating at least two positive clutches.

The positive clutch actuating device 10 is situated partially outside the motor vehicle transmission 11. The actuator unit 20 is situated partially outside the motor vehicle transmission 11, and is situated partially outside the transmission housing 22. The drive 45, the drive shaft 46, the drive wheel 47, and the drive wheel 49 are situated outside the transmission housing 22. The intermediate gear 48 is situated partially outside and partially inside the transmission housing 22. The intermediate gear 48 engages through the transmission housing 22 in order to mesh with the internal gear 18.

In an operating state in which the friction clutch 12 is to be decoupled, the positive clutch 13 is disengaged, thus disconnecting the inner plate carrier 27 from the connecting element 24. Starting from an engaged state (see FIG. 1), the positive clutch 13 is shifted into a disengaged state (not illustrated). For shifting the positive clutch 13, a control and regulation unit, not illustrated in greater detail, appropriately controls the drive 45 of the actuator unit 20, so that the drive 45 simultaneously acts with the rotary movement 16 on the drive wheel 47 and the drive wheel 49, and thus drives same. The drive 45 acts on the internal gear 18 of the actuating unit 14 via the intermediate gear 48, and at the same time acts with the rotary movement 16 on the internal gear of the further actuating unit (not illustrated in greater detail) via the intermediate gear (not illustrated in greater detail). For actuating and thus for disengaging the positive clutch 13, the rotary movement 16 of the internal gear 18 is mechanically converted into the linear movement 17 of the shifting element 38. The internal gear 18, which is acted on by the rotary movement 16, axially moves the shifting element 38 that engages with the gate track 15 linearly, i.e., with respect to the axis of rotation 37 of the internal gear 18, in a disengaging direction 50 in order to disengage the positive clutch 13. The shifting element 38 thus pushes the inner plate carrier 27, the first positive-fit element 28, and the spring element 41, which is formed as one piece with the first synchronization element 42, which are all fixedly connected to one another, in the disengaging direction 50, thus pushing the positive-fit contour 30 from the positive-fit contour 31 and detaching a positive-fit connection between the inner plate carrier 27 and the connecting element 24. The inner plate carrier 27, and thus the friction clutch 12, are thus decoupled from the connecting element 24, and thus from the force flow. The further positive clutch is actuated at the same time due to the simultaneous drive connection of the actuator unit 20 with the actuating unit 14 and the further actuating unit, the further positive clutch being engaged, for example, by the mutually coordinated gate tracks 15 of the two different actuating units 14.

In an operating state in which the friction clutch 12 is to be coupled, the positive clutch 13 is engaged, thus connecting the inner plate carrier 27 to the connecting element 24 in a positive-fit manner. Starting from the disengaged state, the positive clutch 13 is shifted into the engaged state. For shifting the positive clutch 13, the control and regulation unit appropriately controls the drive 45 of the actuator unit 20, so that the drive 45 simultaneously acts with the rotary movement 16 on the drive wheel 47 and the drive wheel 49, and thus drives same. For actuating and thus for engaging the positive clutch 13, the rotary movement 16 of the internal gear 18 is mechanically converted into the linear movement 17 of the shifting element 38. The internal gear 18, which is acted on by the rotary movement 16, linearly moves the shifting element 38 that engages with the gate track 15 in an engaging direction 51 in order to disengage the positive clutch 13. The engaging direction 51 is oriented oppositely from the disengaging direction 50. The shifting element 38 thus pushes the inner plate carrier 27, the first positive-fit element 28, and the spring element 41, which is formed as one piece with the first synchronization element 42, in the engaging direction 51, the inclined surface of the spring element 41 initially flatly contacting the friction lining 44 and thus the second synchronization element 43. In this way a rotational speed of the first positive-fit element 28, and thus of the inner plate carrier 27, is adapted to a rotational speed of the connecting element 24. When synchronization is present, the positive-fit contour 30 is pushed into the positive-fit contour 31 and a positive-fit connection is established between the inner plate carrier 27 and the connecting element 24 by further displacement of the shifting element 38 in the engaging direction 51. In this way the inner plate carrier 27, and thus the friction clutch 12, are coupled to the connecting element 24, and thus to the force flow. The coupling unit 23 may now be shifted under load by means of the friction clutch 12. At the same time, the further positive clutch is actuated by the simultaneous drive connection of the actuator unit 20 with the actuating unit 14 and the further actuating unit, the further positive clutch being disengaged, for example, by the mutually coordinated gate tracks 15 of the two different actuating units 14.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A positive clutch actuating device of a motor vehicle transmission for shifting a positive clutch that is situated in series with a friction clutch, the device comprising:
   an actuating unit, which includes
      at least one gate track configured to mechanically convert a rotary movement into a linear movement in order to actuate the positive clutch; and
      an internal gear, wherein the gate track is a web, slot, or groove defined by an inner periphery of the internal gear.

2. The positive clutch actuating device according to claim 1, wherein the positive clutch is situated upstream from the friction clutch with respect to a drive force flow.

3. The positive clutch actuating device according to claim 2, wherein the positive clutch is configured to disconnect the friction clutch from the drive force flow.

4. The positive clutch actuating device according to claim 1, further comprising:
   a synchronizing unit configured to synchronize the positive clutch.

5. The positive clutch actuating device according to claim 2, further comprising:
   an actuator unit configured to act with the rotary movement on the internal gear in order to actuate the positive clutch.

6. The positive clutch actuating device according to claim 5, wherein the actuator unit is in drive connection with the actuating unit, and at a same time is in drive connection with a further actuating unit that is configured to actuate a further positive clutch.

7. The positive clutch actuating device according to claim 1, wherein the positive clutch is a dog clutch.

8. The positive clutch actuating device according to claim 1, wherein the friction clutch has an inner plate carrier and the positive clutch has a first positive-fit element, the first positive-fit element being connected to the inner plate carrier in a rotationally and displaceably fixed manner.

9. The positive clutch actuating device according to claim 1, wherein the actuating unit further includes a shifting element coupled between the at least one gate track and the friction clutch, wherein the shifting element is coupled to the at least one gate track so that rotation of the internal gear laterally shifts the shifting element.

10. The positive clutch actuating device according to claim 9, wherein the shifting element includes a pin-shaped area engaged in the at least one gate track.

11. The positive clutch actuating device according to claim 1, wherein the at least one gate track includes a first, second, and third area, each having a linear progression, wherein the first and third areas are offset relative to one another and are in parallel with each other, and wherein the second area connects the first and third areas and extends obliquely between the linear progression of the first and third areas.

12. The positive clutch actuating device according to claim 5, wherein the actuator unit is disposed partially outside of a transmission housing.

* * * * *